(12) United States Patent
Pepper et al.

(10) Patent No.: US 6,280,005 B1
(45) Date of Patent: Aug. 28, 2001

(54) ANTI-LOCK BRAKE RELIEF VALVE WITH INTEGRATED FLOW CONTROL ORIFICE

(75) Inventors: Sterling Charles Pepper; Denise Ann Quinnette; Rick Lee Nawman; Daniel H. Anderson, all of El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/379,963

(22) Filed: Aug. 24, 1999

(51) Int. Cl.[7] ................................ F16K 31/06; B60T 8/36
(52) U.S. Cl. ........................................................ 303/119.2
(58) Field of Search .................... 303/119.2; 137/596.17, 137/627.5; 251/129.02, 129.07, 129.14–129.19

(56) References Cited

U.S. PATENT DOCUMENTS

| | | | |
|---|---|---|---|
| 5,556,175 | * 9/1996 | Hayakawa et al. | 303/119.2 |
| 5,725,289 | * 3/1998 | Mueller et al. | 303/119.2 |
| 5,810,330 | * 9/1998 | Eith et al. | 303/119.2 |
| 5,865,213 | * 2/1999 | Scheffel et al. | 303/119.2 |
| 5,879,060 | * 3/1999 | Megerle et al. | 303/119.2 |

* cited by examiner

*Primary Examiner*—Christopher P. Schwartz
(74) *Attorney, Agent, or Firm*—Margaret A. Dobrowitsky

(57) ABSTRACT

A relief valve for an anti-lock braking system includes a plunger-operated ball and a valve body that defines a seat for receiving the ball thereon. The valve body also defines a relief passageway for relieving hydraulic fluid through the passageway at a rate that is appropriate for prevent brake locking, i.e., skidding. To establish the rate, an orifice is integrally formed on the valve body in the passageway, thereby obviating the need for a separate orifice cup.

20 Claims, 1 Drawing Sheet

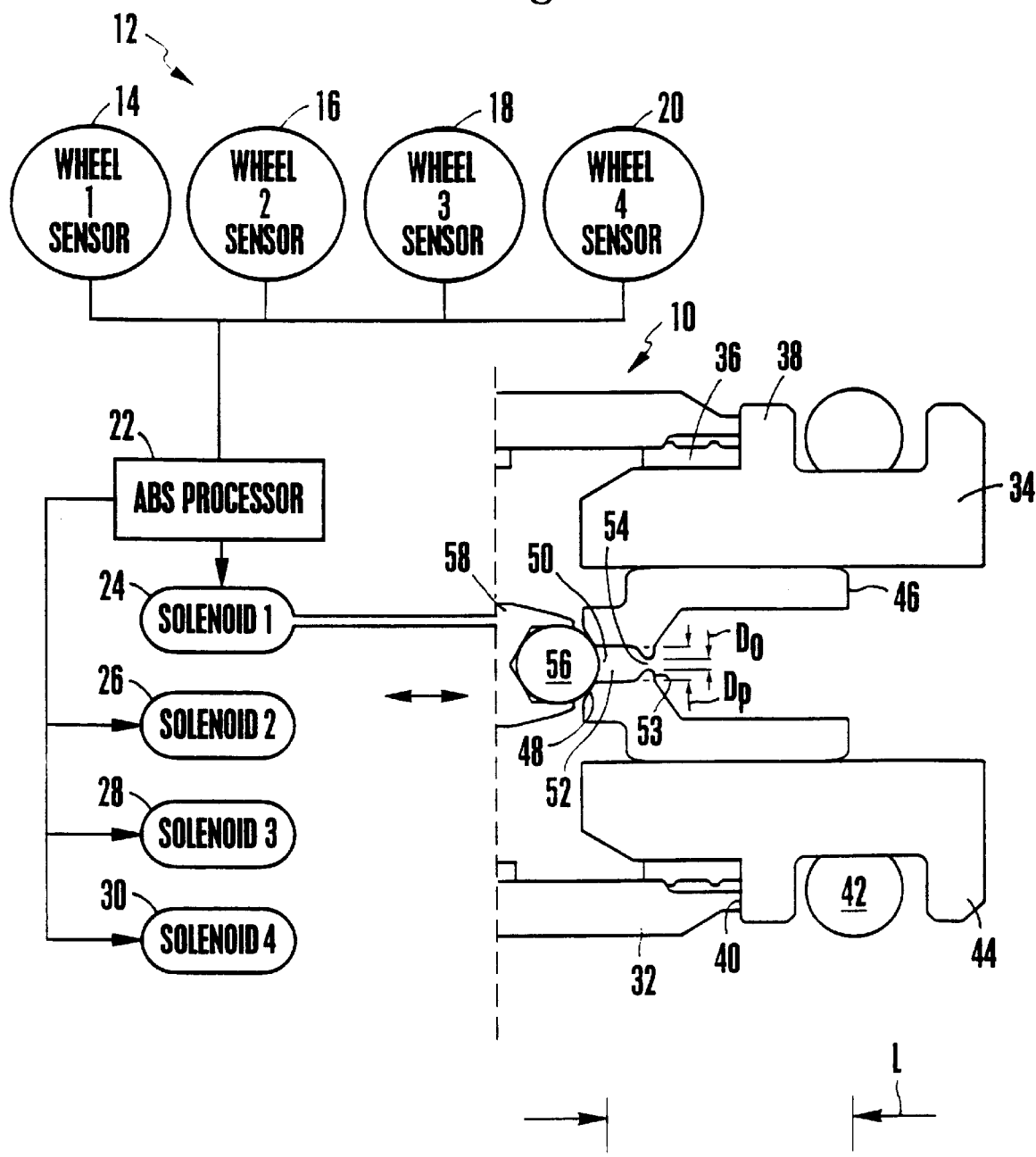
The Figure

# ANTI-LOCK BRAKE RELIEF VALVE WITH INTEGRATED FLOW CONTROL ORIFICE

TECHNICAL FIELD

The present invention relates generally to anti-lock brake relief solenoid valves, and more particularly to methods and structure for controlling hydraulic fluid flow rate through anti-lock brake relief solenoid valves.

BACKGROUND OF THE INVENTION

Anti-lock brake systems include solenoid-actuated relief valves that relieve the hydraulic pressure applied to the brakes when the wheels start to skid, i.e., to lock. By relieving the hydraulic braking pressure, the wheels are permitted to roll while nonetheless being slowed by the brakes, which significantly promotes control of the vehicle relative to what is experienced when the brakes lock.

Typically, an anti-lock relief valve includes a ball that is attached to a solenoid plunger. The relief valve also includes a valve seat that receives the ball. To relieve pressure in the hydraulic lines, the solenoid is actuated to move the ball away from the seat, thereby opening a relief passageway through which hydraulic fluid can flow back to a brake fluid reservoir.

The rate of hydraulic fluid flow through the relief passageway must be established to be sufficiently high to quickly alleviate skidding, but not so high as to cease braking altogether or to cause braking instability. Because the relief passageway itself must be kept sufficiently large to provide an adequate seating surface for the ball at one end of the passageway, conventional relief valves establish the rate of fluid flow by press-fitting an orifice cup into the relief passageway, with the orifice cup being formed with an orifice that is configured to establish the desired fluid flow rate.

As recognized herein, however, several disadvantages attend the use of orifice cups. For example, the orifice cup can be unintentionally deformed during the press-fitting process, degrading the performance of the cup. Furthermore, contaminants can enter the hydraulic system during press-fitting. Moreover, occasionally hydraulic fluid can leak between the sides of the orifice cup and the passageway into which it is press-fit. Still further, once installed only the size of the orifice can be easily inspected, not the entire cup. And, the press-fit process is difficult to monitor for installation errors. Apart from the above problems, requiring an orifice cup that is separate from the valve body adds to the number of components and, hence, to the cost of the relief valve. Having recognized these drawbacks, the present invention has provided the below-disclosed solutions to one or more of the prior art deficiencies.

SUMMARY OF THE INVENTION

A relief valve for an anti-lock brake system includes a valve body that is formed with a relief passageway. The relief passageway terminates at a valve opening that is circumscribed by a valve seat. Per the present invention, the valve body is integrally formed with an orifice in the relief passageway, and the orifice is smaller than the valve opening. A solenoid-actuated valve element is movable between a pressure hold configuration, wherein the valve element contacts the valve seat to prevent fluid flow through the relief passageway, and a pressure relief configuration, wherein the valve element is distanced from the valve seat to permit fluid flow through the passageway.

Preferably, the orifice defines a diameter and the valve body defines a length, and the ratio of the length to the diameter (L/D ratio) is established based on a predetermined vehicle type. The L/D ratio can be, e.g., between seven (7) and twenty (20).

As disclosed in greater detail below, the anti-lock brake system includes a hydraulic fluid line and a valve housing disposed in the line, and the valve body is disposed in the valve housing. In one preferred embodiment, the valve element is a ball. To move the ball, a solenoid plunger is attached to the ball and the plunger is controlled by a solenoid which is actuated by an anti-lock brake system (ABS) processor.

In another aspect, a method is disclosed for forming a relief valve for an anti-lock brake system (ABS). The method includes establishing an orifice diameter and a valve seat opening diameter larger than the orifice diameter, and establishing a valve body length bearing a predetermined relationship to the orifice diameter. Moreover, the method includes forming a relief valve body having the valve body length and an orifice having the orifice diameter. The relief valve body is then assembled into an ABS system.

In still another aspect, a relief valve system for an ABS system includes a hydraulic fluid line, a valve housing disposed in the line, and a valve body disposed in the valve housing. The valve body is formed with an open valve seat and a relief passageway extends away from the seat. An orifice is in the valve body to establish a predetermined rate of fluid flow through the relief passageway.

The details of the present invention, both as to its structure and operation, can best be understood in reference to the accompanying drawings, in which like reference numerals refer to like parts, and in which:

BRIEF DESCRIPTION OF THE DRAWINGS

The FIGURE is a side diagram of the present ABS system relief valve in an ABS relief line, schematically showing the control components.

DESCRIPTION OF THE PREFERRED EMBODIMENT

Referring now to the FIGURE, a pressure relief valve system 10 for an ABS system 12 is shown. As shown, the ABS system 12 includes four wheel sensors 14, 16, 18, 20 for sensing vehicle wheel parameters related to brake lock in accordance with principles known in the art. The sensors 14–20 send their signals to an ABS system processor 22, which controls, among other things, four pressure relief solenoids 24, 26, 28, 30, one for each wheel. For concise disclosure only the pressure relief system 10 that includes the first solenoid 24 will be discussed, it being understood that each of the other solenoids 26, 28, 30 control like pressure relief systems.

As shown, the system 10 includes at least one hydraulic fluid line 32 that carries hydraulic fluid to and from the brake of the wheel associated with the solenoid 24. A rigid metal hollow valve housing 34 is disposed in the line 32. In one embodiment, the housing 34 is engaged with the line 32 by means of an engagement ring 36 in accordance with means known in the art. Also, a radial flange 38 of the housing 34 can abut an end 40 of the line 32 as shown. If desired, an O-ring or other seal 42 can be provided between the flange 38 and a retainer ring 44 of the valve housing 34 to establish a seal between the housing 34 and additional components in accordance with principles known in the art.

Having set forth the above structure, attention is now directed to the annulus of the hollow valve housing 34. A hollow metal unitary valve body 46 is disposed in the valve housing 34 as shown. As intended by the present invention, the valve body 46 is formed with a circular valve seat 48 circumscribing a valve opening 50. A relief passageway 52 extends longitudinally away from the seat 48, and an orifice element 53 defining an orifice 54 is formed in the valve body 46, preferably integrally therewith as shown, to establish a predetermined rate of fluid flow through the relief passageway 50. It can readily be appreciated in reference to the FIGURE that the diameter $D_o$ of the orifice 54 is less than the diameter $D_p$ of the passageway 52 or valve opening 50.

In accordance with the present invention, the valve body 46 has a length L, and the ratio of the length L to the orifice diameter $D_o$ is established based on a predetermined vehicle type. Stated differently, the valve body length L bears a predetermined relationship to the orifice diameter $D_o$, and the predetermined ratio is tailored to the particular vehicle associated with the system 10. In one preferred embodiment, the $L/D_o$ ratio is between seven (7) and twenty (20). In particularly preferred embodiments, the following ratios are used, it being understood that other dimensions suitable for other vehicle types may be used:

| Length (mm) | Orifice diameter (mm) |
|---|---|
| 5.2 | .71 |
| 5.5 | .51 |
| 5.9 | .39 |
| 6.3 | .33 |

A valve element 56, preferably a ball as shown, is movable between a pressure hold configuration (shown in the FIGURE), wherein the valve element 56 contacts the valve seat 48 to prevent fluid flow through the relief passageway 52, and a pressure relief configuration, wherein the valve element 56 is distanced from the valve seat 48 to permit fluid flow through the passageway 52. The valve element 56 is attached to a solenoid plunger 58, which in turn is connected to the solenoid 24 for actuation of plunger 58 in response to the solenoid 24 and, hence, in response to the ABS processor 22.

With the above-disclosed combination of structure, the strength of the valve body 46 with orifice 54 surpasses that of conventional orifice cup valves. Furthermore, flow rates do not deviate from design when the valve body 46 is pressed into the housing 34, in contrast to what might occur when an orifice cup us press-fit into a valve housing. Moreover, the valve body 46 can be 100% airflow tested by the manufacturer, whereas orifice cup valves must first be assembled with their associated valve housings prior to testing. Thus, proper tolerances and flow rates can be ascertained relatively early in the assembly process using the present system 10, compared to conventional orifice cup systems.

Still further, the present system results in the elimination of a component—the orifice cup—heretofore believed to be necessary to ABS systems. This simplifies the present system. Also, since no orifice cup is required, a step in the assembly process, namely, press-fitting an orifice cup into a valve housing, advantageously is eliminated. And, the present flow control system improves dynamic solenoid 24 functioning. The ability to establish the $L/D_o$ ratio promotes flexibility for use in other solenoid applications.

While the particular ANTI-LOCK BRAKE RELIEF VALVE WITH INTEGRATED FLOW CONTROL ORIFICE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C.§112, sixth paragraph, unless the element is expressly recited using the phrase "means for".

What is claimed is:

1. A relief valve for an anti-lock brake system, comprising:
    a valve body formed with a relief passageway terminating at a valve opening circumscribed by a valve seat, the valve body being integrally formed with an orifice in the relief passageway, the orifice being smaller than the valve opening; and
    a solenoid-actuated valve element movable between a pressure hold configuration, wherein the valve element contacts the valve seat to prevent fluid flow through the relief passageway, and a pressure relief configuration, wherein the valve element is distanced from the valve seat to permit fluid flow through the passageway.

2. The valve of claim 1, wherein the anti-lock brake system includes a hydraulic fluid line and a valve housing disposed in the line, the valve body being disposed in the valve housing.

3. The valve of claim 2, wherein the valve element is a ball.

4. The valve of claim 1, further comprising a solenoid plunger attached to the valve element.

5. The valve of claim 4, further comprising an ABS processor generating signals to actuate the plunger.

6. The valve of claim 1, wherein the orifice defines a diameter and the valve body defines a length, and the ratio of the length to the diameter (L/D ratio) is established based on a predetermined vehicle type.

7. A method for forming a relief valve for an anti-lock brake system (ABS), comprising the acts of:
    establishing an orifice diameter and valve seat opening diameter;
    establishing a valve body length bearing a predetermined relationship to the orifice diameter;
    forming a relief valve body having the valve body length, the relief valve body defining an orifice having the orifice diameter; and
    assembling the relief valve body into an ABS system.

8. The method of claim 7, further comprising disposing a ball in reciprocating engagement with the valve seat opening.

9. The method of claim 8, further comprising moving the ball using a plunger, the plunger being actuated in response to signals from an ABS controller.

10. The method of claim 7, further comprising providing a hydraulic fluid line and a valve housing disposed in the line, the valve body being disposed in the valve housing.

11. A relief valve system for an ABS system, comprising:

a hydraulic fluid line;

a valve housing disposed in the line;

a valve body disposed in the valve housing, the valve body being formed with an open valve seat and a relief passageway extending away from the seat, the relief passageway defining a diameter; and an orifice in the valve body distanced from the valve seat to establish a predetermined rate of fluid flow through the relief passageway, the orifice defining a diameter that is smaller than the diameter of the relief passageway.

12. The system of claim 11, wherein the orifice is formed integrally within the valve body.

13. The system of claim 12, further comprising a solenoid-actuated valve element movable between a pressure hold configuration, wherein the valve element contacts the valve seat to prevent fluid flow through the relief passageway, and a pressure relief configuration, wherein the valve element is distanced from the valve seat to permit fluid flow through the passageway.

14. The system of claim 13, wherein the orifice defines a diameter and the valve body defines a length, and the ratio of the length to the diameter (L/D ratio) is established based on a predetermined vehicle type.

15. The system of claim 14, further comprising a hydraulic fluid line and a valve housing disposed in the line, the valve body being disposed in the valve housing.

16. The system of claim 15, wherein the valve element is a ball.

17. The system of claim 16, further comprising a solenoid plunger attached to the valve element.

18. A relief valve for an anti-lock brake system, comprising:

a valve body formed with a relief passageway terminating at a valve opening circumscribed by a valve seat, the valve body being integrally formed with an orifice in the relief passageway, the valve body defining a length, the orifice defining a diameter that is smaller than the valve opening, the ratio of the length to the diameter being between seven (7) and twenty (20) inclusive; and a solenoid-actuated valve element movable between a pressure hold configuration, wherein the valve element contacts the valve seat to prevent fluid flow through the relief passageway, and a pressure relief configuration, wherein the valve element is distanced from the valve seat to permit fluid flow through the passageway.

19. A method for forming a relief valve for an anti-lock brake system (ABS), comprising the acts of:

establishing an orifice diameter and valve seat opening diameter larger than the orifice diameter;

establishing a valve body length that is between seven (7) and twenty (20) times, inclusive, larger than the orifice diameter;

forming a relief valve body having the valve body length, the relief valve body defining an orifice having the orifice diameter; and assembling the relief valve body into an ABS system.

20. A relief valve system for an ABS system, comprising:

a hydraulic fluid line;

a valve housing disposed in the line;

a valve body disposed in the valve housing, the valve body being formed with an open valve seat and a relief passageway extending away from the seat, the valve body defining a length; and an orifice in the valve body to establish a predetermined rate of fluid flow through the relief passageway, the orifice defining a diameter, the ratio of the valve body length to the orifice diameter being between seven (7) and twenty (20) inclusive.

* * * * *